United States Patent
Malik et al.

(10) Patent No.: US 10,042,410 B2
(45) Date of Patent: Aug. 7, 2018

(54) MANAGING DATA CENTER POWER CONSUMPTION

(71) Applicant: International Business Machines Corporation, Armonk, NY (US)

(72) Inventors: Pooja Malik, New Delhi (IN); Vikram Yadav, Ghazaibad (IN)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 14/736,564

(22) Filed: Jun. 11, 2015

(65) Prior Publication Data

US 2016/0363987 A1 Dec. 15, 2016

(51) Int. Cl.
- *G06F 9/00* (2006.01)
- *G06F 1/32* (2006.01)
- *H04L 12/24* (2006.01)
- *G06F 9/50* (2006.01)

(52) U.S. Cl.
CPC ............ *G06F 1/3206* (2013.01); *G06F 1/329* (2013.01); *G06F 9/50* (2013.01); *H04L 41/5003* (2013.01); *H04L 41/5054* (2013.01)

(58) Field of Classification Search
CPC .............................. G06F 1/3296; G06F 1/3209
USPC ............ 713/320, 300, 322, 310, 2; 700/291; 718/1; 455/410
See application file for complete search history.

(56) References Cited

U.S. PATENT DOCUMENTS

| | | | |
|---|---|---|---|
| 7,065,764 B1 * | 6/2006 | Prael ..................... | G06F 9/5072 703/2 |
| 8,001,403 B2 * | 8/2011 | Hamilton .............. | G06F 1/3203 713/300 |
| 8,549,333 B2 | 10/2013 | Jackson | |
| 2005/0235286 A1 * | 10/2005 | Ballew .................. | G06F 9/5038 718/100 |
| 2007/0067657 A1 * | 3/2007 | Ranganathan .......... | G06F 1/206 713/320 |
| 2008/0263373 A1 * | 10/2008 | Meier .................... | G06F 9/3017 713/300 |
| 2008/0301475 A1 * | 12/2008 | Felter .................... | G06F 1/3203 713/300 |
| 2012/0084580 A1 * | 4/2012 | Harchol-Balter ..... | G06F 1/3203 713/310 |

(Continued)

FOREIGN PATENT DOCUMENTS

CN 102194018 B 3/2014

OTHER PUBLICATIONS

Abdullah et al., "Cost-Based Multi-QoS Job Scheduling using Divisible Load Theory in Cloud Computing", Procedia Computer Science 18 (2013) 928-935, SciVerse ScienceDirect, International Conference on Computational Science, ICCS 2013, http://www.academia.edu/5379059/Cost-Based_Multi-QoS_Job_Scheduling_using_Divisible_Load_Theory_in_Cloud_Computing.

(Continued)

*Primary Examiner* — Aurel Prifti

(74) *Attorney, Agent, or Firm* — Alexis N. Hatzis

(57) ABSTRACT

One or more processors determine an energy consumption need of a computing network. One or more processors lower an energy consumption level of one or more nodes in the computing network based, at least in part, on the energy consumption need. One or more processors raise the energy consumption level of at least one of the one or more nodes in the computing network in a dynamic response to a service request.

20 Claims, 4 Drawing Sheets

(56) References Cited

U.S. PATENT DOCUMENTS

| | | | | |
|---|---|---|---|---|
| 2013/0124885 | A1* | 5/2013 | Davis | G06F 1/3206 713/320 |
| 2013/0318371 | A1* | 11/2013 | Hormuth | G06F 1/28 713/320 |
| 2014/0047095 | A1 | 2/2014 | Breternitz et al. | |
| 2014/0068056 | A1 | 3/2014 | Simitsis et al. | |
| 2014/0143558 | A1* | 5/2014 | Kuesel | G06F 1/26 713/300 |
| 2014/0215241 | A1* | 7/2014 | Yoon | G06F 1/324 713/322 |
| 2015/0067356 | A1* | 3/2015 | Trichy Ravi | G06F 1/324 713/300 |
| 2015/0118993 | A1* | 4/2015 | Rune | H04W 12/08 455/410 |
| 2016/0054779 | A1* | 2/2016 | Bodas | G06F 1/3203 700/291 |
| 2016/0170465 | A1* | 6/2016 | Flynn | G06F 1/3203 713/320 |

OTHER PUBLICATIONS

Beloglazov et al., "Optimal Online Deterministic Algorithms and Adaptive Heuristics for Energy and Performance Efficient Dynamic Consolidation of Virtual Machines in Cloud Data Centers", Concurrency and Computation: Practice and Experience, Concurrency Computat.: Pract. Exper. 2012; 24:1397-1420 Published online in Wiley InterScience (www.interscience.wiley.com), DOI: 10.1002/cpe.1867, Copyright c 2012 John Wiley & Sons, Ltd.

Brown, "Google May Have Just Open Sourced the Future Data Center Building the Strategic Data Center", pp. 1-7, Aug. 19, 2014, <http://www.strategicdatacenter.com/281/google-may-have-just-open-sourced-future-data-center>.

Dalapati et al., "Green Solution for Cloud Computing with Load Balancing and Power Consumption Management", pp. 353-359, International Journal of Emerging Technology and Advanced Engineering, ISSN 2250-2459, ISO 9001:2008 Certified Journal, vol. 3, Issue 3, Mar. 2013, <www.ijetae.com>.

Koomey, "My new study of data center electricity use in 2010", pp. 1-4, Jul. 31, 2011, <http://www.koomey.com/post/8323374335>.

Mihailescu et al., "Dynamic Resource Pricing on Federated Clouds", This is a revised version of the paper published in the Proceedings of 10th IEEE/ACM International Symposium on Cluster, Cloud and Grid Computing, IEEE Computer Society Press, pp. 513-517, Melbourne, Australia, May 17-20, 2010.

Saravanan et al., "Dynamic Pricing Model for a Cloud Cache Environment", International Journal of Engineering Trends and Technology (IJETT)—vol. 4 Issue4- Apr. 2013, ISSN: 2231-5381, pp. 743-749. <http://www.ijettjournal.org>.

Vellante, "The Future of the Data Center: Software Will Lead The Way", Wikibon Blog, pp. 1-6, Mar. 7, 2014, <http://wikibon.org/blog/the-future-of-the-data-center/>.

Yadav et al., "Cluster Energy Optimization: An Algorithmic Approach", International Journal of Computer Applications (0975-8887), vol. 71-No. 4, May 2013, pp. 34-39, <www.ijcaonline.org>.

"Facebook Uses CA Technologies as the Foundation for its Broad DCIM Platform", CA Technologies, pp. 1-2, provided via post disclosure dated Sep. 26, 2014, Copyright © 2015 CA, <http://transform.ca.com/DCIM_Facebook_428384_LP_AE.html>.

Datacenter Management | Datacenter Monitoring—ManageEngine OpManager, "Solve your woes with OpManager", pp. 1-5, © 2015 Zoho Corp, provided via post disclosure dated Sep. 26, 2014, <http://www.manageengine.com/network-monitoring/datacenter-management.html>.

"Data Center Services | QTS (Quality Technology Services) | QTS", pp. 1-2, provided via post disclosure dated Sep. 26, 2014, © 2014 QTS Realty Trust, Inc., <http://www.qtsdatacenters.com/>.

Krishnakumar et al., "Design of QoS Based Price and Time Slot Negotiation Mechanism for Cloud Service Reservations", International Journal of Advances In Computer Science and Cloud Computing, ISSN: 2321-4058, vol. 2, Issue- 1, May 2014, pp. 70-75.

"DQ Analyzer Overview", provided via post disclosure dated Sep. 26, 2014, 3 pages, <https://www.ataccama.com/products/dq-analyzer>.

"Emerson Network Power's Infrastructure Management: Data Center Monitoring and Access", provided via post disclosure dated Sep. 26, 2014, 1 page, <http://www.emersonnetworkpower.com/en-IN/Products/INFRASTRUCTUREMANAGEMENT/DataCenterMonitoringandAccess/Pages/Default.aspx>.

"End-To-End Data Center Management & Monitoring For All!", provided via post disclosure dated Sep. 26, 2014, pp. 1-4, <http://www.solarwinds.com/solutions/data_center_management_solutions/>.

"How Many Data Centers are in Existence in the World Today?", Latest News from 100Tb, provided via post disclosure dated Sep. 26, 2014, pp. 1-4, <http://www.100tb.com/blog/2012/12/how-many-data-centers-are-in-existence-in-the-world-today/>.

"OptiView® NetFlow Tracker", NetFlow Analysis—OptiView NetFlow Tracker | Fluke Networks, provided via post disclosure dated Sep. 26, 2014, 9 pages, <http://www.flukenetworks.com/enterprise-network/network-monitoring/OptiView-NetFlow-Tracker>.

Sowmya et al., "Strategic Bidding for Cloud Resources under Dynamic Pricing Schemes", Published in: 2012 International Symposium on Cloud and Services Computing (ISCOS), Date of Conference: Dec. 17-18, 2012, pp. 25-30, Print ISBN: 978-1-4673-4854-6, DOI: 10.1109/SCOS.2012.28, Publisher: IEEE.

"Virtual Machine Monitor & VM Management | SolarWinds", © 2003-2015 SolarWinds Worldwide, LLC., 16 pages provided via post disclosure dated Aug. 29, 2014,<http://www.solarwinds.com/virtualization-manager.aspx>.

* cited by examiner

MANAGING DATA CENTER POWER CONSUMPTION

BACKGROUND OF THE INVENTION

The present invention relates generally to the field of cloud computing, and more particularly to data center power management.

Cloud computing relies on sharing of resources to achieve coherence and economies of scale. At the foundation of cloud computing is the broader concept of converged infrastructure and shared services. Cloud computing focuses on maximizing the effectiveness of shared resources. Usually, cloud resources are not only shared by multiple users but are also dynamically reallocated per demand. This can work for allocating resources to users. For example, a cloud data center that serves European users during European business hours with a specific application (e.g., email) may reallocate the same resources to serve North American users during North America's business hours with a different application (e.g., a web server). This approach maximizes the use of computing power thus reducing environmental damage as well since less power, air conditioning, rack space, etc. are required for a variety of functions. With cloud computing, multiple users can access a single server to retrieve and update their data without purchasing licenses for different applications.

The present availability of high-capacity networks, low-cost computers and storage devices as well as the widespread adoption of hardware virtualization, service-oriented architecture, and autonomic and utility computing have led to a growth in cloud computing. Companies can scale up as computing needs increase and then scale down again as demands decrease.

A data center is a facility used to house computer systems and associated components, such as telecommunications and storage systems. It generally includes redundant or backup power supplies, redundant data communications connections, environmental controls (e.g., air conditioning, fire suppression) and various security devices. Large data centers, such as the ones that provide cloud computing infrastructure, are industrial scale operations using as much electricity as a medium size city.

In traditional computing, a node is an object on a network. For example, on a home network, a computer, router, and printer might all be nodes. Data centers are essentially networks, with nodes that communicate with each other to solve a larger problem than any singular computer could in a reasonable amount of time. A typical cloud computing data center contains several types of nodes, e.g. controller nodes, compute nodes, storage nodes, etc.

SUMMARY

Embodiments of the present invention provide a method, system, and program product for managing data center power consumption. One or more processors determine an energy consumption need of a computing network. One or more processors lower an energy consumption level of one or more nodes in the computing network based, at least in part, on the energy consumption need. One or more processors raise the energy consumption level of at least one of the one or more nodes in the computing network in a dynamic response to a service request.

DETAILED DESCRIPTION

Data center nodes are usually drawing power even when they are idling. In a typical scenario, seventy to eighty percent of power being pulled by a data center is wasted powering nodes that are not being used. Embodiments of the present invention recognize that data center energy costs will be decreased if data center nodes that are not being used are powered down. Embodiments of the present invention provide a capability to power down data center nodes that are not being used without diminishing the cloud computing efficiency of the data center.

The present invention will now be described in detail with reference to the Figures.

Figure 1:
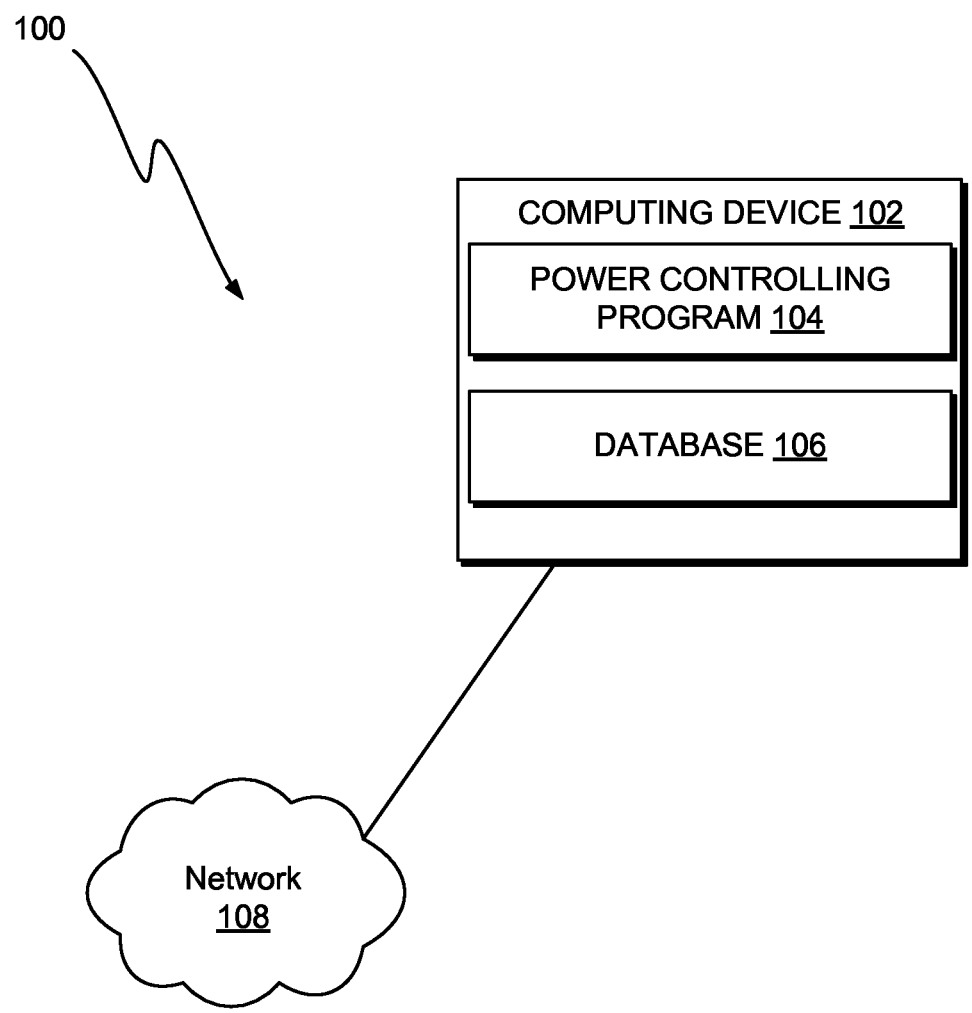
FIG. 1 is a functional block diagram illustrating a data center power controlling environment, in accordance with an exemplary embodiment of the present invention.

FIG. 1 is a functional block diagram illustrating a data center power controlling environment, generally designated 100, in accordance with one embodiment of the present invention. Data center power controlling environment 100 includes computing device 102 connected over network 108. Computing device 102 includes power controlling program 104 and database 106.

In various embodiments of the present invention, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to database 106 and is capable of executing power controlling program 104. Computing device 102 may include internal and external hardware components, as depicted and described in further detail with respect to FIG. 4.

In this exemplary embodiment, power controlling program 104 and database 106 are stored on computing device 102. However, in other embodiments, power controlling program 104 and database 106 may be stored externally and accessed through a communication network, such as network 108. Network 108 can be, for example, a local area network (LAN), a wide area network (WAN) such as the Internet, or a combination of the two, and may include wired, wireless, fiber optic or any other connection known in the art. In general, network 108 can be any combination of connections and protocols that will support communications between computing device 102, power controlling program 104, and database 106, in accordance with a desired embodiment of the present invention.

In exemplary embodiments, power controlling program 104 modulates the number of nodes that are turned on at any given time in a data center. Power controlling program 104 also maintains data center efficiency by determining whether jobs requested by clients will be accepted at any given time and powering nodes on, if necessary, in order to accommodate accepted jobs.

In exemplary embodiments, database 106 includes historic data regarding node usage of a datacenter. Power controlling program 104 uses the historic node usage data in database 106, at least in part, to determine the percentage or number of data center nodes that are in an active state, a less active state, or turned off. Database 106 includes information about the state of data center nodes. For example, database 106 includes tracking information on whether data center nodes are active, inactive, or in an energy state in between active and inactive, such as a sleep mode. Database 106 also includes and tracks information such as whether data center nodes are overloaded or under-loaded.

In exemplary embodiments, database 106 includes information regarding service-level agreements between a data center and clients. Power controlling program 104 uses this data to determine whether the quality of service provided by the data center will be sufficient for client service requests. Database 106 also includes cost data for the data center, which power controlling program 104 uses for billing clients.

Figure 2:
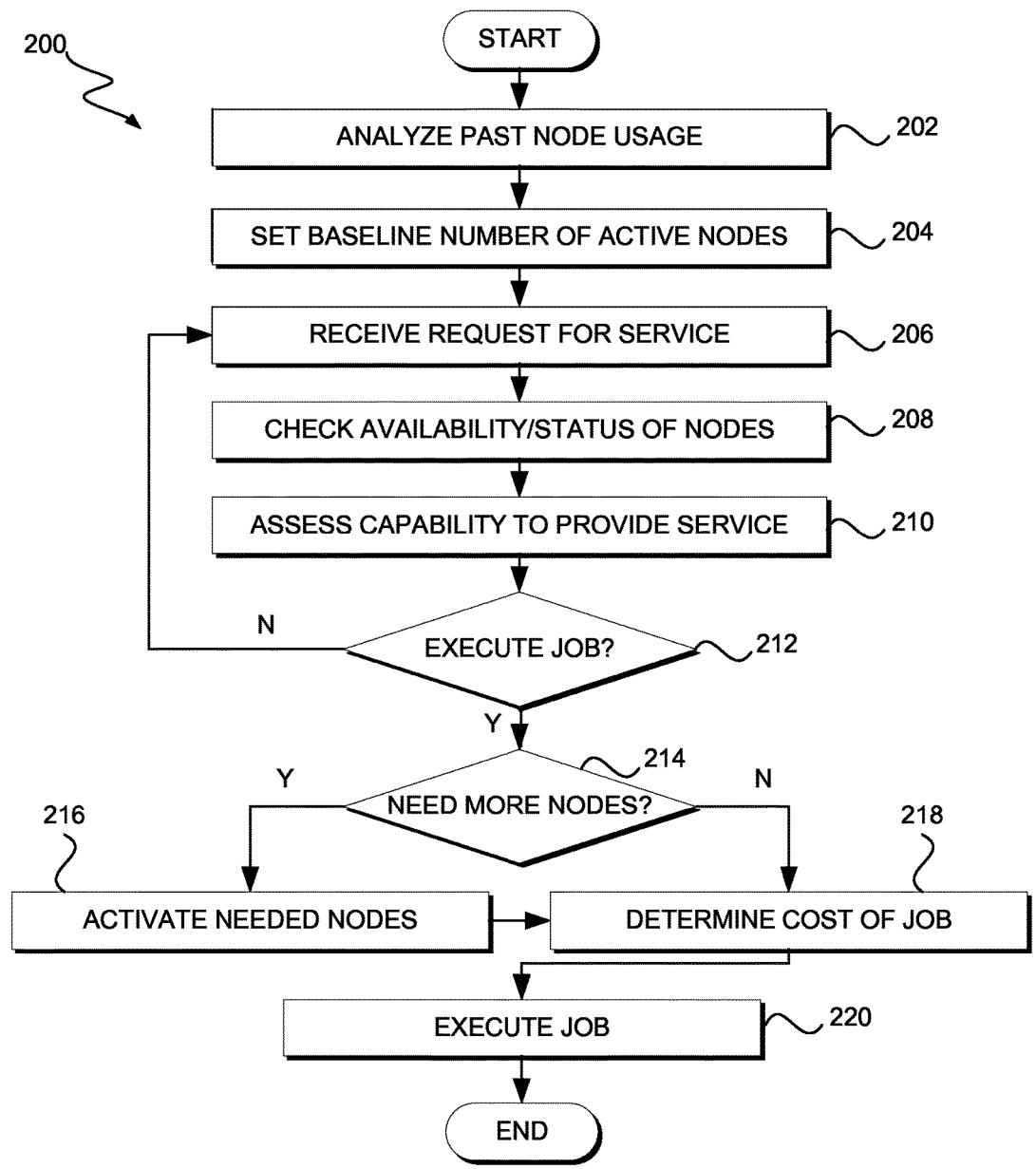
FIG. 2 illustrates operational processes of a power controlling program, on a computing device within the environment of FIG. 1, in accordance with an exemplary embodiment of the present invention.

FIG. 2 illustrates operational processes 200 of power controlling program 104, on computing device 102 within the environment of FIG. 1, in accordance with an exemplary embodiment of the present invention.

In step 202, power controlling program 104 analyzes past client node usage in order to make a prediction about future client node usage. Past client node usage is analyzed over various time periods. Analytics for daily client node usage provides data to predict what times of a given day are busiest for the nodes of a data center and which times are the least busy. Trends are also identified by analyzing longer periods of past client usage. For example, by analyzing past client node usage of a data center for numerous one week periods, power controlling program 104 predicts what days of a week typically are the busiest for the data center nodes. Analysis over the course of a year shows trends that can be, for example, seasonal or quarterly in nature. For instance, analysis of past client node usage of data center nodes shows the maximum usage occurs during winter and a minimal usage occurs during the summer. In addition, the same analysis shows that, within a quarter, peak client node usage occurs at the end of the quarter and minimal client node usage occurs at the beginning of the quarter.

Analysis of past client node usage by power controlling program 104 also provides data regarding the growth of client node usage over time. For example, a growth rate of ten percent consistently over a period of several years indicates the likelihood of a continued growth rate of ten percent. The data acquired in step 202 is stored in database 106.

In step 204, power controlling program 104 sets a baseline number of active nodes based, at least in part, on data acquired in step 202 by power controlling program 104 and stored in database 106. In one embodiment, power controlling program 104 varies the baseline number of active nodes based on trends observed in step 202. For example, power controlling program 104 determines that fifty percent of the nodes in a data center are likely to be in use by clients during weekdays towards the end of a quarter and ten percent of the data center nodes are likely to be in use by clients during weekday nights towards the end of the quarter. Power controlling program 104 sets the number of active nodes at a percentage above fifty percent during weekdays and above ten percent during weekday nights towards the end of the quarter. The balance of the data center nodes are in one or both of an inactive state and a diminished activity state such as a sleep state.

In various embodiments, power controlling program 104 sets the number of active nodes in step 204 at a level that a data center administrator determines will not cause a delay in response to client jobs or violate the service-level agreement (SLA). For example, data acquired by power controlling program 104 and stored in database 106 (step 202) indicates that the predicted percentage of utilized data center nodes for a given period will be thirty percent. The administrator of the data center sets the percentage of active nodes at forty percent to ensure service to clients is satisfactory and the SLA is complied with.

In step 206, power controlling program 104 receives a request for service from a data center client. In various embodiments, the request includes information such as what type of nodes are requested (e.g., compute nodes, controller nodes, storage nodes, etc.) and a scale of the request (i.e. the number of nodes that are requested).

In step 208, power controlling program 104 checks the availability and status of nodes in a data center. In various embodiments, the availability of the nodes depends on both the node types requested and the scale of the request. In various embodiments, node status includes whether the nodes are active, inactive, or at some power level in between active and inactive, such as a sleep setting. In various embodiments, node status also includes information on whether nodes are overloaded or under-loaded. Overloading a node slows its computing speed whereas an under-loaded node can take on more client traffic without losing much computing speed. In cases where nodes are overloaded or under-loaded, power controlling program 104 includes a load-balancing algorithm to balance node loads.

In step 210, power controlling program 104 assesses whether the data center has the capability to provide the service. In various embodiments, power controlling program 104 determines how many nodes of a given type are available and active versus how many nodes of that type are required. In various embodiments, a requested service is possible if one or more jobs are performed on one or more shared nodes. However, power controlling program 104 assesses whether the data center SLA will likely be violated in such cases.

In decision 212, power controlling program 104 determines whether to execute the job thereby providing the requested service. In various embodiments, decision 212 depends on the likely quality of service that will be provided if the job is executed. In one possible scenario, power controlling program 104 reschedules jobs that cannot be executed at peak usage hours. For example, a large scale service request is received during a busy weekday by a data center. The service request is too large to be accommodated by the available activated nodes during the daytime, but can be accommodated at night with the nighttime available activated nodes. In this scenario, power controlling program 104 decides based on factors such as the SLA whether to activate the number of nodes required and execute the job during the daytime (i.e., immediately) or reschedule the job for the less busy nighttime hours. If decision 212 is to refuse the job or reschedule it (i.e., "no"), then power controlling program 104 returns to a state that is ready to receive service requests from clients (step 206). If decision 212 is to execute the job (i.e., "yes"), then power controlling program 104 continues to decision 214.

In decision 214, power controlling program 104 decides whether sleeping or inactive nodes need to be activated to execute the job. In one scenario, power controlling program 104 decides that more nodes are required because the already activated data center nodes are too busy with other clients to execute the job. In another scenario, power controlling program 104 decides that more nodes are required because the response time for the job to be executed would be too slow, thereby violating the data center SLA. In yet another scenario, power controlling program 104 decides that no more nodes are required because the already activated data center nodes are capable of executing the job without violating the SLA. If power controlling program 104 decides to activate more nodes (i.e., "yes"), then it proceeds to step 216. If power controlling program 104 decides not to activate more nodes (i.e. "no"), then it proceeds to step 218.

In step 216, power controlling program 104 activates nodes that are needed to execute the job satisfactorily, i.e., without violating the data center SLA. Depending on the requested service, power controlling program 104 turns on one or more of: controller nodes, compute nodes, and storage nodes.

In step 218, power controlling program 104 determines the cost of the executed job. In various embodiments, factors that affect the cost of services include the time the service was executed, a scale of the executed job, whether inactivated or sleeping nodes were turned on to execute the job, what types of nodes were used to execute the service (e.g., compute, controller, and storage nodes have different charges), etc.

In step 220, power controlling program 104 executes the job. For example, power controlling program 104 turns on needed central processing units (CPUs) for an infrastructure as a service (IaaS) provider in order to execute a job for a client.

Figure 3:
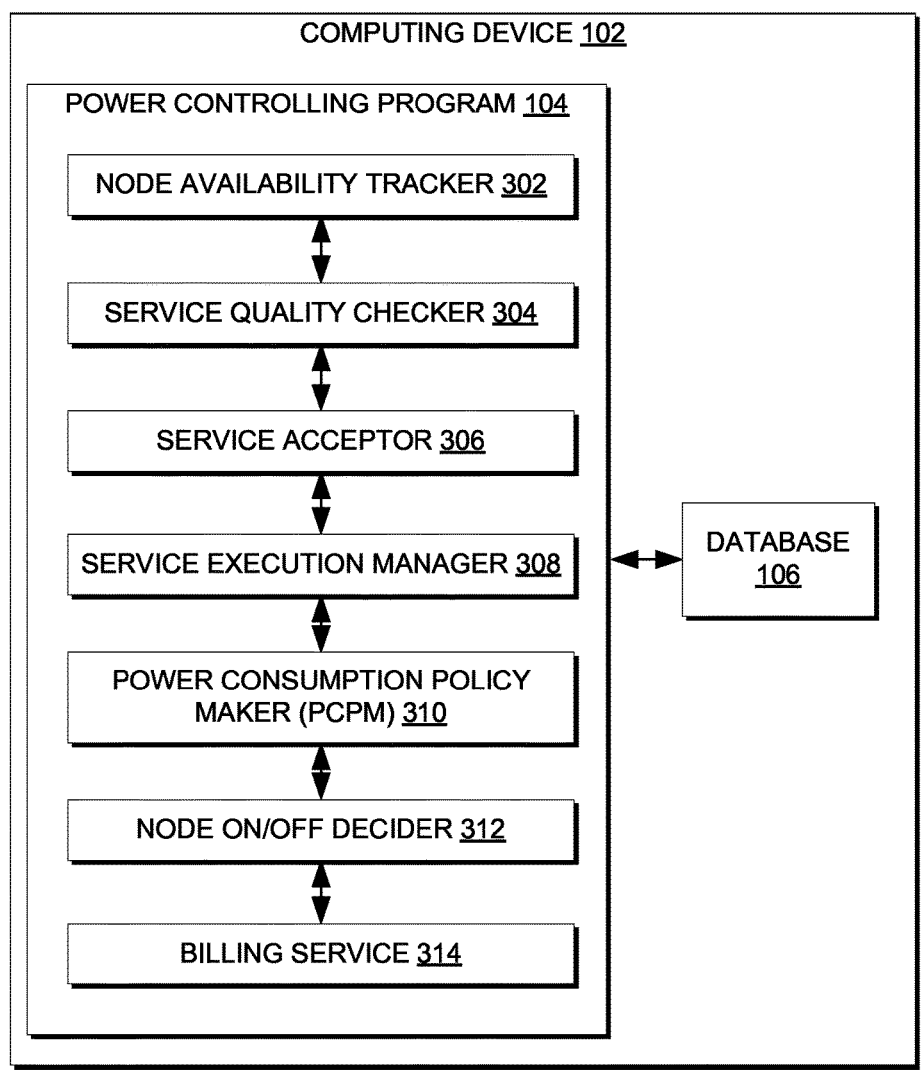
FIG. 3 depicts a block diagram of modules of the power controlling program, on a computing device within the environment of FIG. 1, in accordance with an exemplary embodiment of the present invention.

FIG. 3 depicts a block diagram (300) of modules of power controlling program 104, on computing device 102 within the environment of FIG. 1, in accordance with an exemplary embodiment of the present invention.

The node availability tracker 302 module stores and tracks information regarding the status of data center nodes in database 106. The status of data center nodes includes whether they are overloaded or under-loaded as well as whether they are active, inactive, or a power level between active and inactive, such as a sleep mode.

The service quality checker 304 module uses information supplied by the node availability tracker 302 module to determine and manage node response times. The service quality checker 304 module ensures availability and scalability for each application hosted by the data center. The node response times, availability, and scalability are governed by a SLA for each domain or application hosted in the data center. If the data center has sufficient capability to execute the requested service without violation of the governing SLA, then service quality checker 304 module allows the service acceptor 306 module to accept the job. The service execution manager 308 module assigns jobs accepted by the service acceptor 306 module to available active nodes.

The power consumption policy maker (PCPM) 310 module consists of two sub-modules. A first sub-module analyzes historic node usage in order to determine a baseline percentage of nodes to keep activated for predicted future service requests. A second sub-module is a big data analysis submodule, which analyzes unstructured data from the data center.

The node on/off decider 312 module dynamically activates or deactivates data center nodes based on service request levels. The node on/off decider 312 module sends data to the PCPM 310 module so that the baseline percentage of data center nodes can be adjusted as necessary.

The billing service 314 module records the daily usage of the data center nodes. The billing service 314 module assigns charges for node usage based on factors that include node demand at time of use (predicted and actual), amount of time the nodes were used, types of nodes used (e.g., controller, compute, and storage nodes have different rates), etc.

Figure 4:
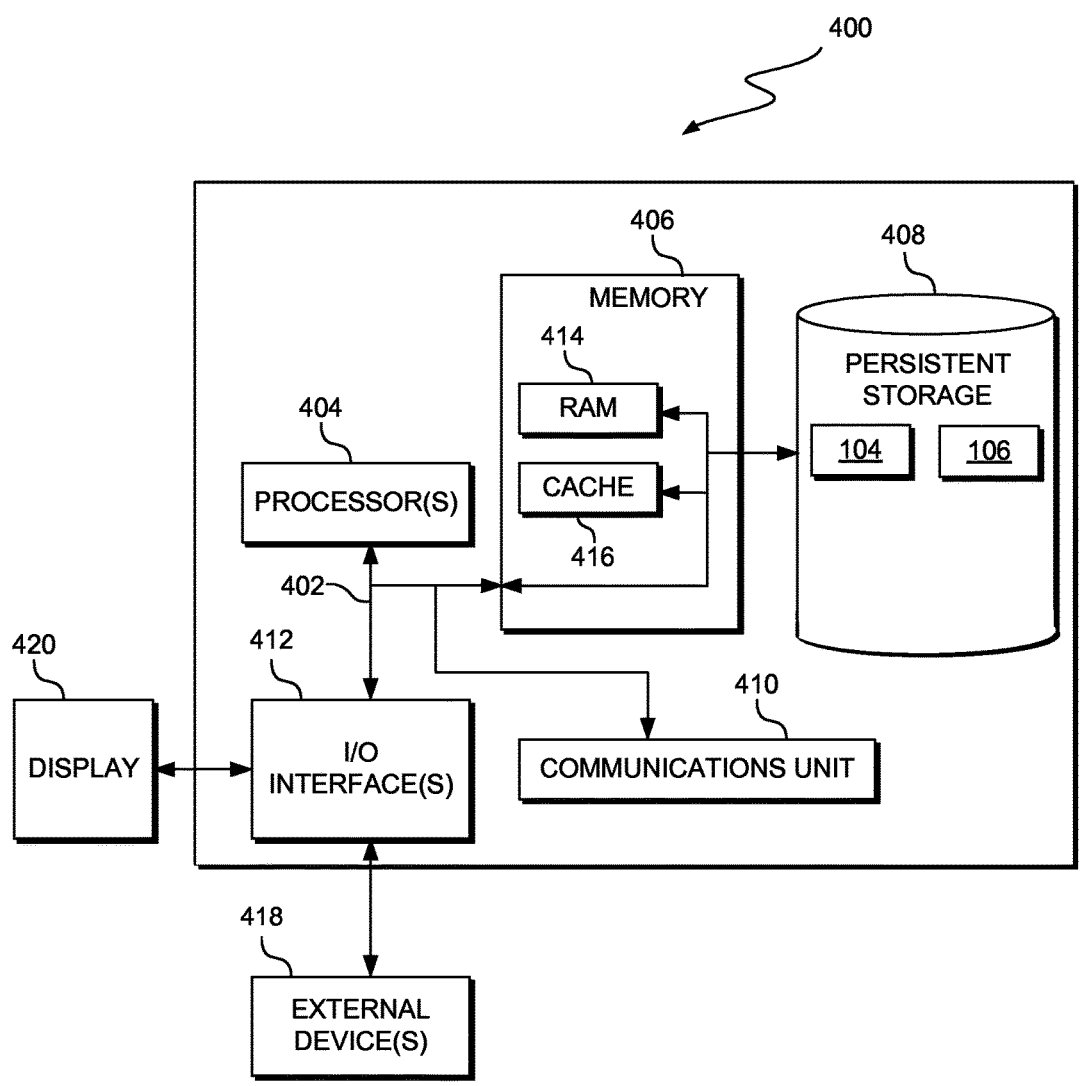
FIG. 4 depicts a block diagram of components of the computing device executing the power controlling program, in accordance with an exemplary embodiment of the present invention.

FIG. 4 depicts a block diagram, 400, of components of computing device 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Power controlling program 104 and database 106 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 108. In these examples, communications unit 410 includes one or more network interface cards. Communications unit 410 may provide communications through the use of either or both physical and wireless communications links. Power controlling program 104 and database 106 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., power controlling program 104 and database 106, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   determining, by one or more processors, an energy consumption need of a computing network;
   determining, by one or more processors, an energy cost to power on and power off one or more nodes in the computing network;
   lowering, by one or more processors, an energy consumption level of at least one or more nodes in the computing network based, at least in part, on the energy consumption need and the determined energy cost; and
   raising, by one or more processors, the energy consumption level of at least one of the at least one or more nodes in the computing network in a dynamic response to a service request.

2. The method of claim 1, wherein the step of lowering, by one or more processors, an energy consumption level of at least one or more nodes in the computing network based, at least in part, on the energy consumption need further comprises:
   lowering, by one or more processors, an energy consumption level of at least one or more nodes in the computing network based, at least in part, on the energy consumption need and an analysis of a past level of use for the one or more nodes in the computing network.

3. The method of claim 1 further comprising:
   determining, by one or more processors, whether to execute the service request based, at least in part, on an analysis of a capability of the computing network to provide the service request.

4. The method of claim 1 further comprising:
   determining, by one or more processors, whether to execute the service request based, at least in part, on whether a service agreement can be satisfied if the service request is executed.

5. The method of claim 1, wherein the computing network is an infrastructure as a service (IaaS) provider.

6. The method of claim 1, wherein the step of raising, by one or more processors, the energy consumption level of at least one of the at least one or more nodes in the computing network in a dynamic response to a service request further comprises:
   scheduling, by one or more processors, a job requested by a client at a time when the at least one or more nodes in the computing network can execute the job under one or more service agreement criteria.

7. The method of claim 1, wherein the at least one or more nodes in a computing network further comprise:
   one or more of a controller, a computer, and a storage node in a computer network.

8. A computer program product comprising:
   one or more computer-readable storage media and program instructions stored on at least one of the one or more computer-readable storage media, the program instructions comprising:
   program instructions to determine an energy consumption need of a computing network;
   program instructions to determine an energy cost to power on and power off one or more nodes in the computing network;
   program instructions to lower an energy consumption level of at least one or more nodes in the computing network based, at least in part, on the energy consumption need and the determined energy cost; and
   program instructions to raise the energy consumption level of at least one of the at least one or more nodes in the computing network in a dynamic response to a service request.

9. The computer program product of claim 8, wherein the program instructions to lower an energy consumption level of at least one or more nodes in the computing network based, at least in part, on the energy consumption need further comprises:
   program instructions to lower an energy consumption level of at least one or more nodes in the computing network based, at least in part, on the energy consumption need and an analysis of a past level of use for the one or more nodes in the computing network.

10. The computer program product of claim 8 further comprising:
    program instructions to determine whether to execute the service request based, at least in part, on an analysis of a capability of the computing network to provide the service request.

11. The computer program product of claim 8 further comprising:
    program instructions to determine whether to execute the service request based, at least in part, on whether a service agreement can be satisfied if the service request is executed.

12. The computer program product of claim 8, wherein the computing network is an infrastructure as a service (IaaS) provider.

13. The computer program product of claim 8, wherein the program instructions to raise the energy consumption level of at least one of the at least one or more nodes in the computing network in a dynamic response to a service request further comprises:
    program instructions to schedule a job requested by a client at a time when the at least one or more nodes in the computing network can execute the job under one or more service agreement criteria.

14. The computer program product of claim 8, wherein the at least one or more nodes in a computing network further comprise:
    one or more of a controller, a computer, and a storage node in a computer network.

15. A computer system comprising:
one or more computer processors;
one or more computer-readable storage media; and
program instructions stored on at least one of the one or more computer-readable storage media for execution by at least one of the one or more processors, the program instructions comprising:
program instructions to determine an energy consumption need of a computing network;
program instructions to determine an energy cost to power on and power off one or more nodes in the computing network;
program instructions to lower an energy consumption level of at least one or more nodes in the computing network based, at least in part, on the energy consumption need and the determined energy cost; and
program instructions to raise the energy consumption level of at least one of the at least one or more nodes in the computing network in a dynamic response to a service request.

16. The computer system product of claim 15, wherein the program instructions to lower an energy consumption level of at least one or more nodes in the computing network based, at least in part, on the energy consumption need further comprises:
program instructions to lower an energy consumption level of at least one or more nodes in the computing network based, at least in part, on the energy consumption need and an analysis of a past level of use for the one or more nodes in the computing network.

17. The computer system product of claim 15 further comprising:
program instructions to determine whether to execute the service request based, at least in part, on an analysis of a capability of the computing network to provide the service request.

18. The computer system product of claim 15 further comprising:
program instructions to determine whether to execute the service request based, at least in part, on whether a service agreement can be satisfied if the service request is executed.

19. The computer system product of claim 15, wherein the computing network is an infrastructure as a service (IaaS) provider.

20. The computer system product of claim 15, wherein the program instructions to raise the energy consumption level of at least one of the at least one or more nodes in the computing network in a dynamic response to a service request further comprises:
program instructions to schedule a job requested by a client at a time when the at least one or more nodes in the computing network can execute the job under one or more service agreement criteria.

* * * * *